United States Patent
Konishi

(10) Patent No.: US 6,939,094 B2
(45) Date of Patent: Sep. 6, 2005

(54) AUTONOMOUS POWER INTERFACE FOR MODIFYING LIMITED ROTATION SPEED OF A MACHINE

(75) Inventor: M. Howard Konishi, Bothell, WA (US)

(73) Assignee: Macro Technologies Inc., Kirkland, WA (US)

( * ) Notice: Subject to any disclaimer, the term of this patent is extended or adjusted under 35 U.S.C. 154(b) by 0 days.

(21) Appl. No.: 10/353,479

(22) Filed: Jan. 28, 2003

(65) Prior Publication Data

US 2004/0146368 A1 Jul. 29, 2004

(51) Int. Cl.⁷ .................................................. B23C 9/00
(52) U.S. Cl. .................................... 409/230; 409/231
(58) Field of Search ................................. 409/230, 231, 409/232, 211, 215, 31, 131

(56) References Cited

U.S. PATENT DOCUMENTS

| | | | | |
|---|---|---|---|---|
| 3,960,035 A | * | 6/1976 | Workman et al. ........... | 475/125 |
| 4,522,269 A | * | 6/1985 | Adman et al. ............... | 81/470 |
| 4,552,495 A | * | 11/1985 | Malzkorn .................... | 409/230 |
| 4,709,455 A | * | 12/1987 | D'Andrea et al. .......... | 409/215 |
| 4,716,657 A | * | 1/1988 | Collingwood ............... | 408/147 |
| 4,795,293 A | * | 1/1989 | Mizoguchi .................. | 409/230 |
| 5,636,949 A | * | 6/1997 | Nakamura et al. .......... | 409/230 |
| 5,697,739 A | * | 12/1997 | Lewis et al. ................ | 409/230 |
| 6,474,914 B1 | * | 11/2002 | Lang .......................... | 409/230 |
| 6,729,813 B2 | * | 5/2004 | Sahm et al. ................ | 409/230 |

* cited by examiner

Primary Examiner—Derris H. Banks
Assistant Examiner—Dana Ross
(74) Attorney, Agent, or Firm—Graybeal Jackson Haley LLP

(57) ABSTRACT

The invention is directed to a secondary power tool system, components thereof and methods for using the same. It is preferably for use with an automatic tool change CNC machine having a rotating tool receiving element. The system includes a power source delivery interface component having an interlock and a high-speed rotating spindle accessory component. The delivery interface provides an autonomous connection point for delivering any one of several modes of power, e.g., compressed air. The rotating spindle accessory includes a housing adapted to be received by the rotating tool receiving element and a motor. A connector arm operably coupled to the housing defines at least one conduit for delivering the power, such as compressed air, to the motor. It also includes a delivery probe adapted to actuate the power delivery interface interlock so that when presented to the power delivery interface, power is autonomously delivered to the motor.

11 Claims, 3 Drawing Sheets

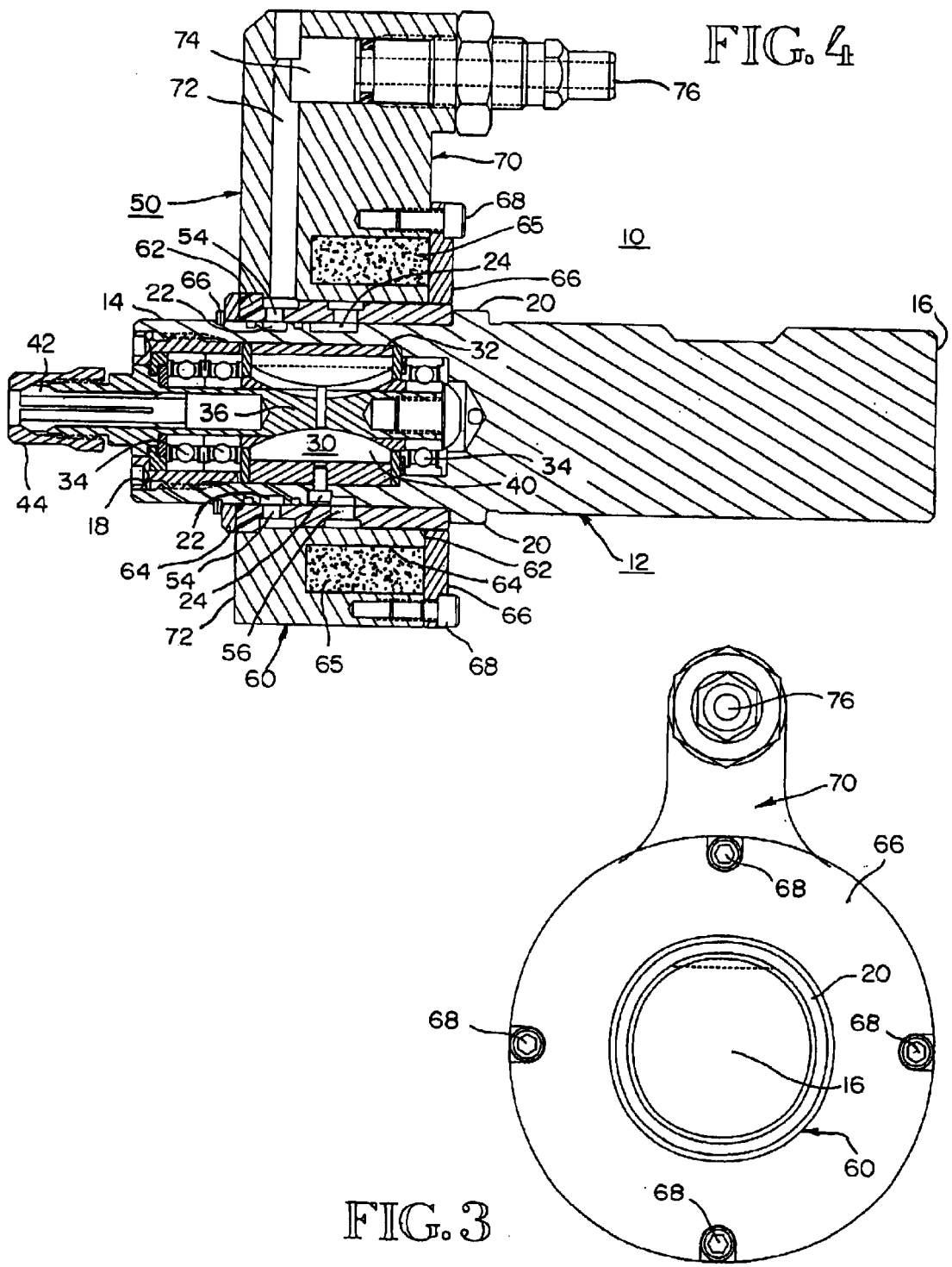

AUTONOMOUS POWER INTERFACE FOR MODIFYING LIMITED ROTATION SPEED OF A MACHINE

BACKGROUND OF THE INVENTION

Description of the Prior Art

Externally powered tools exist that can be inserted into and withdrawn from a CNC machine spindle, whether manually or during an automatic tool change. Some externally powered tools are available from a CNC tool magazine, but require that the machine be stopped after change-over so that suitable power connections can be established with the tool. Other externally powered tools are pre-connected to their power source, but must be manually engaged with the CNC machine because it is not possible to locate the tool in the tool magazine. Thus, most CNC machines must be programmed to stop prior to the normal machining cycle to permit manual tool installation or creation of a suitable power link with the tool after coupling with the machine. In addition to the foregoing, once the externally powered tool has been installed, it must be activated. Because many CNC machines lack the firmware/software to operate external devices, the power supply must usually be manually operated.

In order to remove an externally powered tool, the above-described operations must be reversed. If the tool is an air tool for example, then the high pressure supply lines must be bled before the power link is removed; alternatively, the link can remain, but the tool must then be de-energized and manually removed from an idle CNC machine, and then the machine restarted.

While the foregoing provide solutions in that they permit one to modify the rotation speed of a CNC machine tool, the operations involve human intervention into the work environment during operation of the machine. This involves labor costs, production inefficiencies, safety issues and the like. It therefore appears that the prior art lacks a means for autonomously connecting an auxiliary powered tool to a machine for modifying the limited rotation speed of that machine.

SUMMARY OF THE INVENTION

The invention is directed towards systems, components thereof, and methods for using a secondary power tool with an existing computer controlled machine where the machine includes a tool receiving spindle and a housing. The system of the invention comprises two primary components, namely a power delivery interface including a power interlock mountable to the machine housing and adjacent to the tool receiving spindle, and a high-speed rotating spindle accessory including a power delivery probe configured to receive power from the power delivery interface, operable in conjunction with delivery means for delivering power from the delivery probe to a motor disposed in the accessory. A method for establishing the system on a computer controlled machine comprises mounting an operative power delivery interface to the machine housing adjacent to the spindle, and temporarily locating the accessory on the tool receiving spindle while substantially contemporaneously coupling the delivery probe to the delivery interface. A method of operation comprises the foregoing, and further comprises autonomously delivering power to the motor upon coupling of the power delivery probe to the power delivery interface.

The term "power" as used herein is not confined to electrical power, but includes any type of energy capable of being utilized to create a motive force, i.e. electrical energy or kinetic energy. Thus, as used herein, "power" comprises pressurized air, pressurized non-air gas, pressurized fluid, and electricity. Unless otherwise noted, both fluid and gas are considered a "fluid", i.e., a gas is a type of "fluid."

In accordance with the invention, the nature of the power source and the type of motor used in the system are considered largely a matter of design selection. Although there are clear advantages to using pressured air as a source of power, design criteria may dictate certain advantages over pressurized air. A feature of the invention is its lack of restriction in this respect. To cause the invention to operate, one need only establish a suitable connection between the power delivery interface and the source of power. Once established, the selected form of power is immediately available for use by the high-speed rotating spindle accessory upon its coupling with the power delivery interface. The ultimate selection of the mode of power delivery is largely considered a design choice, and the means by which this is achieved is considered to be within the skill of an ordinary person skilled in the art.

In order to autonomously provide power to the high-speed rotating spindle accessory upon coupling with the power delivery interface, an interlock is used. Unlike the prior art wherein the power supply must be regulated to start and stop operation of the powered tool, an interlock operates to regulate power delivery to the accessory. Thus, when the accessory couples with the power delivery interface, the interlock is actuated, thereby causing power to be delivered to the power delivery probe for use by the accessory motor.

The incorporation of an interlock device transcends the selection of a power source. In instances wherein kinetic energy is used by the motor, e.g., compressed gas or pressurized fluid, the use of an interlock device is highly desirable since it removes the requirement for separately (non-autonomously) regulating the flow of the energy-bearing mass. In embodiments utilizing kinetic energy, the pressurized fluid is present at the interlock. Thus, the accessory becomes "live" when the interlock is operated by engaging with the accessory, thereby eliminating the requirement to externally regulate the flow of the energy-bearing medium. Where electrical power is used, an interlock provides a safety feature, e.g., arcing is prevented just prior to connection; the nature of an open circuit prior to coupling of the accessory to the interface inherently prevents unintentional loss of this form of power.

While any portion of the accessory may act as an interlock activator, preferably the delivery probe serves this purpose in addition to acting as a power delivery element. By so doing, the total number of elements is minimized and the interlock can be placed at or near the point of power delivery from the power delivery interface.

In the event that electricity is selected as the power source, at least a portion of the accessory that links to the interface, which is preferably the delivery probe, should be sufficiently conductive to deliver electrical current from the delivery interface to the accessory delivery means. Thus, the delivery probe would include at least one conductor. Electrical current can then be delivered from the interface to the probe.

The delivery probe may act as an interlock activator or may only function as an electrical conductor. In instances wherein an interlock is desired, the probe may further function to operate the interlock, thereby passing electrical power to the point of interface with the delivery probe. Alternatively, a separate structure associated with the accessory may function as the interlock activator, with the delivery probe only serving as a conductor.

In a preferred embodiment, the power delivery interface comprises a pressurized fluid delivery interface component having an inlet port and an outlet port fluidly coupled by a conduit. In such an embodiment, an interlock device is desired and takes the form of a normally closed valve, which is disposed between the inlet port and the outlet port. This arrangement creates a temporary fluid obstruction between the inlet port and the outlet port. The valve is preferably selectively operable by mechanical intervention, such as by insertion of a power delivery probe in the form of a male air fitting into the outlet port. Alternative means for operating the valve include mechanical, electrical, optical, and magnetic linkage between the power delivery interface housing and the valve, the purpose being to provide a means for autonomous operation of the valve upon engagement of the interface component with the accessory component.

Still referring to a preferred embodiment, the high-speed rotating spindle accessory component comprises a body in which is disposed a fluid operable motor. The body may include or may be associated with an adapter structure such as an end mill shank to permit location of the accessory in the machine spindle. The motor is further operatively coupled to the fluid delivery probe, which in turn is insertable into the outlet port of the fluid delivery device as previously described. Once inserted, a substantially sealed fluid passage is established between the inlet port of the pressurized fluid delivery interface and the motor.

As described above, it is considered desirable to establish the fluid passage between the inlet port and the motor upon insertion of the power delivery probe into the outlet port. In a preferred embodiment, the tip of the probe operates to open the interlock disposed between the inlet and outlet ports. In this manner, the interlock is opened only when a suitable (preferably sealing) coupling is made between the power delivery probe and the fluid delivery interface.

Alternative configurations include but are not limited to use of a separate mechanical structure on the accessory to interface with a mechanical linkage coupled to the valve; use of a magnetic flux generating element on the accessory to interface either directly with the valve or indirectly with a linkage operatively coupled to the valve, both being responsive to magnetic fields; use of a light emitting element in conjunction with a photosensor and related circuitry to operate the valve, etc. Thus, the invention may utilize a variety of means for controlling the operation of the valve.

BRIEF DESCRIPTION OF THE DRAWINGS

FIG. 3 is a top plan view of the accessory component shown in FIG. 1 (shown without the end mill holder for clarity);

FIG. 4 is a cross sectional elevation view of the accessory component of FIG. 1 detailing the various elements comprising the accessory;

DESCRIPTION OF THE PREFERRED EMBODIMENTS

Figure 1:
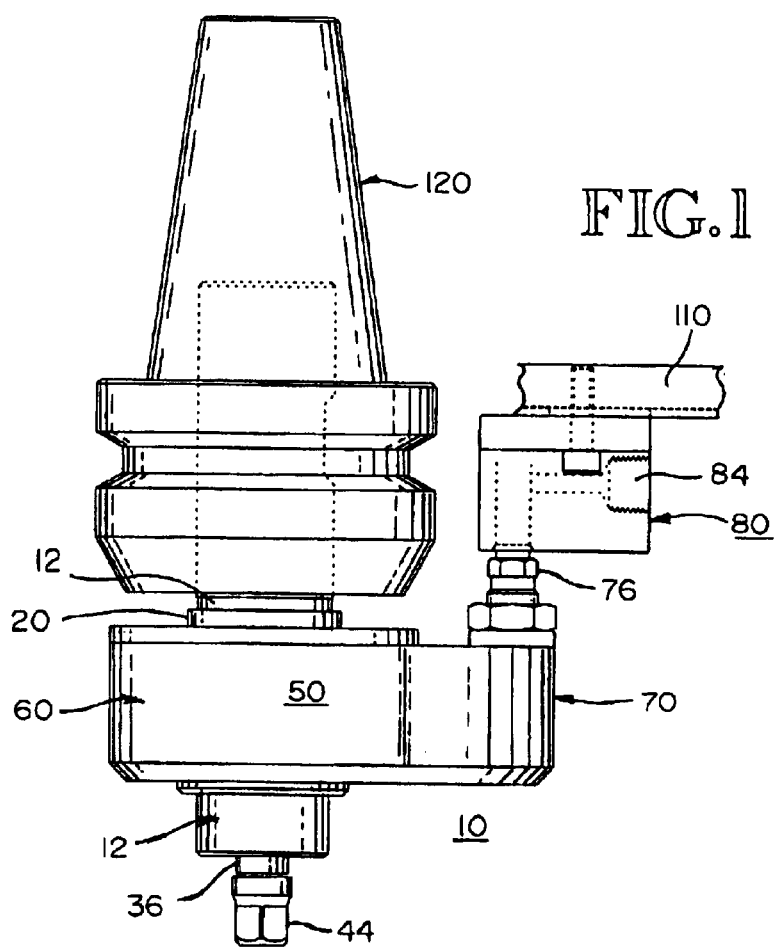
FIG. 1 is an elevation view of an embodiment of a secondary power tool comprising a high-speed rotating spindle accessory component shown located in an end mill holder and engaged with a pressurized fluid delivery interface component.

The following discussion is presented to enable a person skilled in the art to make and use the invention. Various modifications to the preferred embodiment will be readily apparent to those skilled in the art, and the generic principles herein may be applied to other embodiments and applications without departing from the spirit and scope of the present invention as defined by the appended claims. Thus, the present invention is not intended to be limited to the embodiment show, but is to be accorded the widest scope consistent with the principles and features disclosed herein.

Turning then to the several Figures where in like numerals indicate like parts and more particularly to FIGS. 1–4, high speed rotating spindle accessory component 10 is shown in various views. Accessory component 10 comprises housing 12, air motor assembly 30, and connector arm 50. Unless otherwise noted herein, all major components are constructed from steel.

Housing 12 includes outer surface 14, end mill shank end 16, and defines air motor recess 18, in which is located motor assembly 30. Additional features of housing 12 include annular abutment 20, air inlet port 22 and air exhaust port 24. End mill shank end 16 is configured to be received by a conventional end mill holder 120 of an automatic tool change machine, and in the present embodiment has a nominal diameter of 1.00 inches.

Air motor assembly 30 includes motor housing 32 and upper and lower bearings 34, which support spindle 36. Spindle 36 receives a plurality of vanes 40 that cooperate with motor housing 32. Spindle 36 also receives collet 42, which threadably engages with collet nut 44, as is well known in the art. Further, air motor assembly 30 includes an inlet port and an exhaust port to receive and discharge compressed air used by air motor assembly 30. Air motor assembly 30 is conveniently held within motor recess 18 via retainer 49.

In addition to the aforementioned components, rotating spindle accessory component 10 further comprises connector arm 50. Connector arm 50 provides a means by which compressed air is delivered to and discharged from air motor assembly 30. Connector arm 50 includes annular portion 60 and arm portion 20. Annular portion 60 wholly surrounds a significant portion of air motor assembly 30. It includes upper portion 62, which defines recess 64 for holding muffler 65, and which is in turn retained by annular plate 66 and machine screws 68. Lower portion 72 of annular portion 60 includes a groove formed to receive o-ring 62. When installed on housing 10, thrust washer 64 and retaining ring 66, in combination with annular abutment 20, operate to axially retain connector arm 50 to housing 12.

Connector arm 50 further includes an interior surface, which defines inlet port 54 and exhaust port 56 for delivering and discharging compressed air. In particular, exhaust port 56 serves as a conduit between muffler 65 and exhaust port 24 of housing 12.

In addition to annular portion 60, connector arm 50 also comprises arm portion 70. The primary purpose of this portion is to provide a suitable means for receiving and delivering compressed air to inlet port 54, which in turn is in fluid communication with motor assembly 30 via inlet port 22 of housing 12. Arm portion 70 defines lateral conduit 72 and vertical conduit 74. Vertical conduit 74 is formed to receive a suitable connector such as male air fitting 76, which is preferably constructed from brass and is of a quick connect type.

Figure 6:
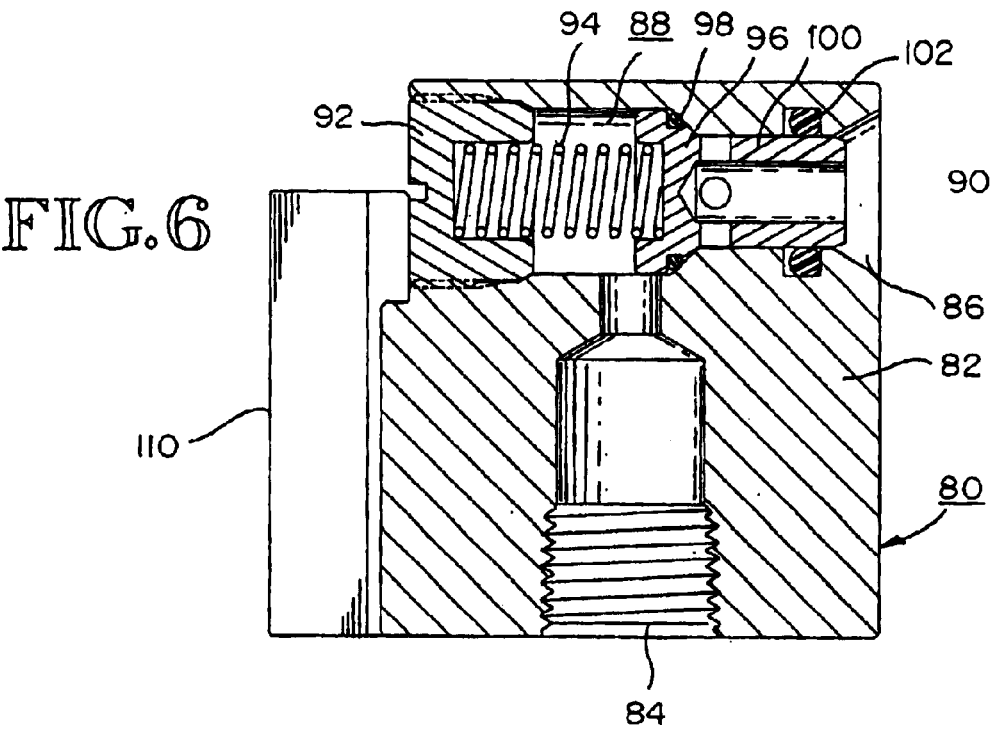
FIG. 6 is a cross sectional elevation view of the interface component of FIG. 1 detailing the various elements comprising the interface.
Figure 5:
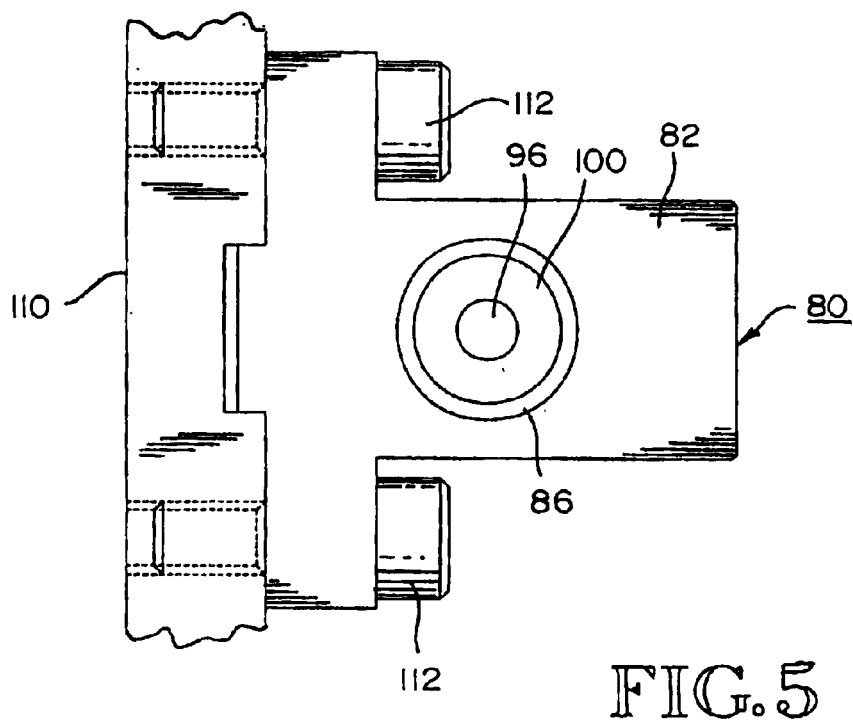
FIG. 5 is a bottom plan view of the interface component shown in FIG. 1.

Turning then to FIGS. 5 and 6, delivery interface component 80 will now be described. Delivery interface 80 comprises housing 82, which further defines threaded inlet port 84, flanged outlet port 86 and cylinder 88. Cylinder 88 is shown as being orthogonal to threaded inlet port 84, although the geometry selection is generally a design consideration. Disposed in cylinder 88 is valve assembly 90, which includes plug 92, compression spring 94, poppet 96, o-ring 98, female air fitting 100, and o-ring 102. Because spring 94 is a compression spring, valve assembly 90 is normally closed. Upon insertion of a probe element such as male air fitting 76 into female air fitting 100, poppet 96 compressively reacts against spring 94, thereby establishing an operative conduit between inlet port 84 and outlet port 86 of housing 82.

The installation and operation of the described secondary power tool will now be set forth. Prior to operation of the tool, it is necessary to mount delivery interface component 80 adjacent to the primary spindle and end mill holder of the machine in which the secondary power tool is to be used. Preferably, the machine is a CNC machine with automatic tool changing (ATC) capabilities. While versatile, the rotational speed limit of the primary spindle prevents the use of such precision machines in applications wherein high spindle speeds are desired. By using the secondary power tool system described herein, the advantages of the CNC ATC machine can be realized with respect to precision or high volume work requiring high spindle rotation speeds.

Figure 2:
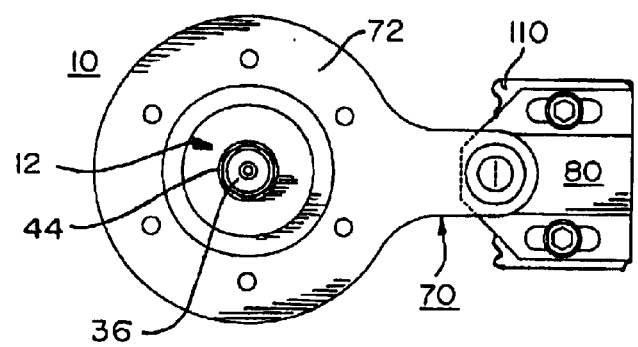
FIG. 2 is a bottom plan view of the assembly shown in FIG. 1 (shown without the end mill holder for clarity)

Turning then to FIGS. 1 and 2, the selected mounting surface 110 should be square and normal to the machine spindle. Moreover, delivery interface component 80 should be spaced appropriately thereon to vertically and laterally receive male air fitting 76 when rotating spindle accessory component 10 has been received by the end mill holder. This relationship is best shown in FIG. 1. Once delivery interface component 80 has been suitably mounted to the machine such as by cap screws 112, it is only then necessary to introduce compressed air to inlet port 84 thereof.

Because delivery of compressed air to high-speed rotating spindle accessory component 10 need not be externally regulated (compressed air is always present at delivery interface component 80 and can be accessed by insertion of a suitable probe element such as male air fitting 76), any reliable source of compressed air can be used. Upon presenting the source of compressed air to inlet port 84, insertion of any probe into outlet port 86 will cause poppet 96 to unseat, thereby permitting egress of compressed air through outlet port 86.

In operation, the CNC ATC machine will recover the secondary power tool from a tool crib or other tool storage structure and engage it with its holder. When engaged with its holder, the position and geometry of male air fitting 76 with delivery interface component 80 will cause pressurized air to be delivered to air motor assembly 30 as previously described. Having pressurized air, collet 42 will begin to rotate at a predetermined speed until rotating spindle accessory component 10 is removed from holder 120.

As noted earlier, the means by which the rotating spindle accessory component operates is not critical to the invention, although very significant advantages can be obtained for any given application by selecting one form over another. Thus, compressed air or gas used in conjunction with an air motor is but one way of imparting rotation to the component. Pressurized fluids and electricity are viable alternatives presuming that a suitable motor is used and a suitable delivery interface is selected, as will be appreciated by those persons skilled in the art.

What is claimed:

1. A secondary power tool system for use with an automatic tool change CNC machine having a tool receiving element mounted in a housing, and an available pneumatic source of compressed gas, the power tool system comprising:
   a pneumatic delivery interface component linkable to the available pneumatic source and mountable to the machine housing adjacent to the machine tool receiving element, the interface comprising an interlock to modulate and selectively obstruct compressed gas flow there through; and
   a high-speed rotating spindle accessory component comprising a housing, a pneumatic motor operatively disposed in the housing, a delivery probe for receiving compressed gas from the delivery interface; delivery means for delivering compressed gas from the delivery probe to the motor, and a spindle assembly linked to the motor wherein a portion of the housing is receivable by the machine tool receiving element and the probe couples with the pneumatic delivery interface component to operate the interlock, thereby causing the interlock to permit passage of compressed gas when the accessory is received by the machine tool receiving element.

2. Then system of claim 1 wherein the pneumatic delivery interface component comprises an inlet port for receiving compressed gas from the pneumatic source and an outlet port fluidly coupled by a conduit to the inlet port, and the interlock is disposed between the inlet port and the outlet port to modulate the gas flow there between; wherein the delivery probe defines a conduit to accept gas from the outlet port; wherein the delivery means comprises at least one conduit operatively coupling the probe to the motor; and wherein the motor is a pneumatically driven motor.

3. The system of claim 2 further comprising a connector arm attached to the housing wherein the connector arm defines the delivery means and wherein the connector arm comprises the probe.

4. The system of claim 2 wherein the delivery means is one of a fluid conduit defined by a portion of the high-speed rotating spindle accessory component housing or a discrete conduit connecting the probe to the high-speed rotating spindle accessory component housing.

5. The system of claim 2 wherein the interlock comprises a normally closed check valve that opens upon sufficient insertion of the probe into the outlet port.

6. The system of claim 5 wherein the check valve opens upon contact with the probe.

7. The system of claim 1 wherein an axis of the delivery probe is parallel to the axis of the spindle assembly.

8. A high-speed rotating spindle accessory for use with an automatic tool change CNC machine having a tool receiving element mounted in a housing, the spindle accessory comprising:
   a housing comprising an end mill shank and defining a recess;
   a pneumatic motor operatively disposed in the housing recess;
   a delivery probe for receiving compressed gas from a pneumatic delivery interface;
   an interlock to modulate and selectively obstruct the flow of compressed gas between the delivery probe and the motor;
   delivery means for delivering compressed gas from the delivery probe to the motor; and a spindle assembly linked to the motor wherein the probe is matable with the pneumatic delivery interface when the accessory is received by the machine tool receiving element.

9. A method for modifying a spindle rotation speed beyond its inherent operational limit in an automatic tool change CNC machine having a rotating tool receiving element mounted in the machine housing, the method comprising:
   a) mounting a pneumatic delivery interface component linkable to an available source of compressed gas to the machine housing adjacent to the tool receiving element wherein the delivery interface component comprises an input interface, an output interface and an interlock operatively coupled to the input and output interfaces to modulate and selectively obstruct compressed gas flow there between;
   b) presenting compressed gas to the input interface;
   c) selectively engaging with the tool receiving element a high-speed rotating spindle accessory component comprising a housing, a pneumatic motor operatively disposed in the housing, a delivery probe for receiving compressed gas from the output interface of the delivery interface component; delivery means for delivering compressed gas from the delivery probe to the motor, and a spindle assembly linked to the motor; and
   d) autonomously establishing an operative fluid link between the probe and the output interface of the delivery interface component through operation of the interlock when the accessory is operably received by the machine tool receiving element.

10. The method of claim 9 comprising operating the interlock when the accessory is received by the machine tool receiving element to thereby supply compressed gas to the accessory.

11. A secondary power tool system for use with an automatic tool change CNC machine having a rotating tool receiving element mounted in a housing, and an available source of compressed air comprising:
   a compressed air delivery interface component mountable to the machine housing, adjacent to the machine tool receiving element, the interface comprising a body defining an inlet port for receiving compressed air from the source of compressed air and an outlet port fluidly coupled to the inlet port, and a normally closed check valve disposed between the inlet port and the outlet port to modulate and selectively obstruct compressed air flow there through, the check valve comprising a spring biased poppet sealingly engageable with the interface body; and
   a high-speed rotating spindle accessory comprising a housing defining a cavity at a first end, at least one air conduit extending from the cavity to an outer surface of the housing, an end mill shank having an axis at a second end, and a connector arm defining a connecting air conduit fluidly coupled to the at least one air conduit; an air-driven motor operatively coupled to the at least one air conduit and disposed in the cavity, and having an axis of rotation generally coincident with the mill shank axis; a delivery probe fluidly coupled to the connecting air conduit to substantially and sealingly interface with the outlet port of the compressed air delivery interface; and a spindle assembly linked to the air-driven motor wherein the end mill shank is receivable by the machine tool receiving element and the delivery probe couples with the outlet port of the compressed air delivery interface and operates to open the normally closed check valve when the high-speed rotating spindle accessory is received by the machine tool receiving element.

* * * * *